Patented Dec. 19, 1950

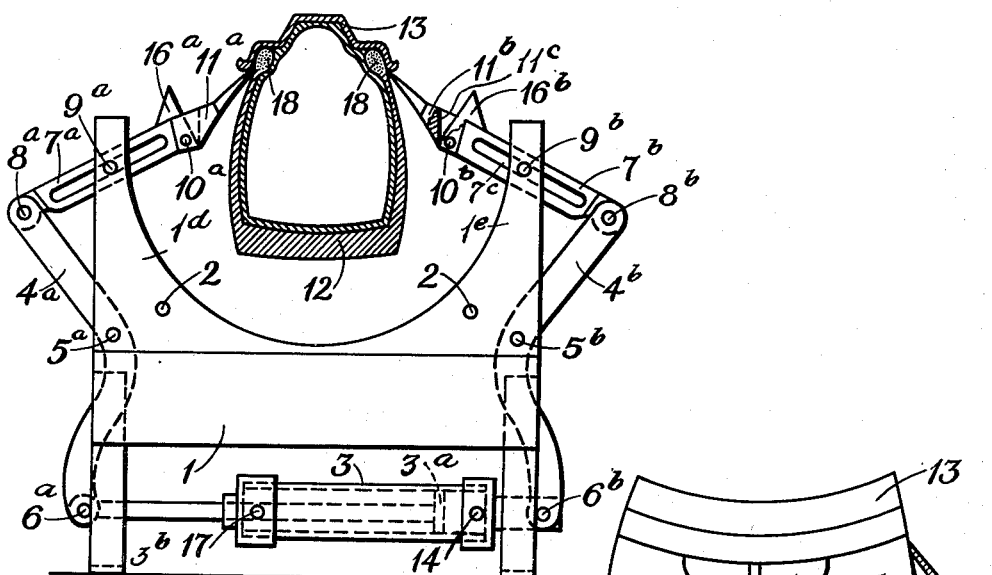
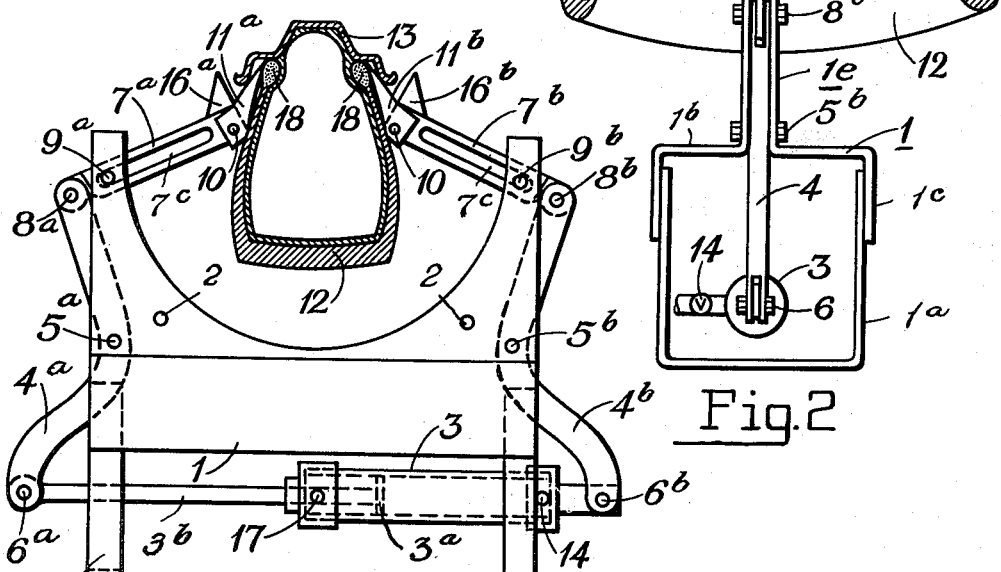
Inventors
Lloyd W. Mullins,
Melvin D. Butterfield,

2,534,950

UNITED STATES PATENT OFFICE 2,534,950

AXIALLY COLLAPSING TYPE TIRE BEAD BREAKING DEVICE

Melvin D. Butterfield and Lloyd W. Mullins, Wichita, Kans.

Application May 22, 1946, Serial No. 671,599

5 Claims. (Cl. 157—1.28)

This invention relates to improvements in tire bead and rim separating devices commonly referred to as tire breakers, and more particularly to a machine capable of quickly and safely breaking the beads of a deflated automobile or truck tire away from the solid rim or wheel on which it is mounted, preparatory to removing the tire from the rim or wheel.

Stated broadly, a main object of the present invention is the provision of a machine which facilitates the removal of deflated automobile and truck tires from the solid rims or wheels on which they are mounted, by breaking the bead of the tire away from the edge flange of the rim or wheel. Another important object of the invention is the provision of a simple, readily operated yet highly efficient power-operated machine for breaking an automobile or truck tire from its rim or wheel as aforesaid, and which is further effective for all sizes of tires, both passenger car and truck tires. A further and more specific object of the invention is to provide a power-activated tire breaker in which the tire to be broken away from its rim or wheel can be set up for the breaking operation by the simple procedure of rolling the tire into position between oppositely disposed breaking members which are so constructed that they hold the tire in correct position for breaking, and which upon power being supplied thereto are operative to effect the desired breaking away of the tire from its rim in substantially automatic manner.

Other objects will be in part obvious and in part hereinafter pointed out in connection with the following analysis of the invention wherein is illustrated in detail a preferred embodiment of the invention.

In the drawings—

Fig. 1 is a front elevation of a machine according to the invention in the operation of breaking a tire away from the rim, the tire and its rim being shown in section;

Fig. 2 is a partial side elevation of the machine shown in Fig. 1; and

Fig. 3 is a view similar to Fig. 1 showing the positioning of the parts just prior to the completion of the tire breaking operation.

In the drawings, wherein like reference characters designate like parts throughout the several views, a tire-breaking machine according to the invention is shown to be supported on an elongated box-like frame 1 fashioned from sheet-iron plates bent to provide a channel-shaped base part 1a and two double-flanged top angles 1b, 1c (Fig. 2) which are affixed to the base as by welding. The upper flanges of the top plates are extended upwardly to provide spaced uprights 1d, 1e (Fig. 1) which project above the box-like frame proper at each end thereof, the flanges being cut away between uprights to form a substantially semi-circular recess providing adequate space between uprights to receive the tire to be broken. The plate flanges which form the uprights are spaced one from the other as seen in Fig. 2, and are maintained in properly spaced position by spacing bolts 2 (Fig. 1).

The frame 1 is shown to be supported above the floor or ground by corner legs 1f and below the frame is disposed a power cylinder 3 whose axis is preferably aligned with the longitudinal axis of the frame. The power cylinder 3, together with its piston 3a and piston rod 3b are freely supported as a unit from the lower ends of two oppositely disposed and operating rocker arms 4a, 4b fulcrumed intermediate their ends to the frame at 5a, 5b, the lower ends of the rocker arms being connected, respectively, to the piston and cylinder by pins 6a, 6b. By reference to Fig. 2, it will be seen that the rocker arms operate in the space provided between the upright flanges of the frame top plates.

The upper ends of the rocker arms are in turn pivotally connected to two oppositely disposed and substantially horizontally arranged pusher links 7a, 7b by pins 8a, 8b. As shown, the pusher links 7a, 7b are each formed with an elongate slot 7c, in which operate pins 9a, 9b carried by the frame uprights. Accordingly the pusher links, through their pin and slot connection with the frame uprights and their pivotal connection with the rocker arms 4a, 4b, are mounted for movement in substantially endwise direction towards and away from each other, being guided in such movement by the pins 9a, 9b.

With the pusher links 7a, 7b extending towards one another, their adjacent ends carry by means of removable pivot pins 10a, 10b, the oppositely disposed thrust pieces 11a, 11b which, as best seen in Fig. 2, are shaped somewhat as a scoop and, by reference to Figs. 1 and 3, converge to a pointed or shovel edge which is arcuate to correspond to rim curvature. The thrust pieces 11a, 11b through their pivotal connection with the pusher links are permitted limited angular or swinging movement but by virtue of their slotted outer end construction and the manner in which they straddle the ends of the pusher links, they normally assume a position in which they extend generally inwardly from said links and are inclined slightly upwardly as shown in Fig. 1.

Thus, upon the free or bladed edges of the thrust pieces engaging with the tire side walls or beads, the thrust pieces can swing only in upward direction. The thrust pieces are each provided with a stop surface 11c which is engageable against the end face of its pusher links to limit swinging movement in upward direction beyond that shown in Fig. 3. The stop surfaces 11c may also bear against stop blocks 16a, 16b carried at the adjacent ends of the pusher links 7a, 7b, as shown, and in addition to their function of limiting the throw of the thrust pieces, the stop blocks are also adapted to engage against the rim of the tire being broken under the condition to be described.

By reference to Fig. 1, it will be seen that the oppositely disposed thrust pieces 11a, 11b have initial inclination such that their free edges tend, when they are actuated by movement of the pusher links 7a, 7b into engagement with a tire disposed in position between the frame uprights, to engage under the edges of the rim and to enter the joints between tire heads and rim. When so engaged, further approach movement of the pusher links 7a, 7b causes the pivotally connected thrust pieces to swing in upward direction for the limited angular movement permitted by their stop surfaces, so that their inclination increases as indicated in Fig. 3. During such swinging movement, the free edges of the thrust pieces drive into the joint between the tire beads and rim, with final approach movement of the pusher links resulting in the tire beads being pushed towards one another and laterally out of contact with the rim by the conjoint action of the thrust pieces.

In carrying out the operation of breaking the beads of a tire from its rim by the described machine, the tire mounted on rim is rolled or otherwise brought into position between the frame uprights and is held so that the free edges of the thrust pieces 11a, 11b may, when actuated into contact with the sides of the tire, engage the tire just below the edges of the rim. The operator admits fluid under pressure, such as compressed air, to the head end of cylinder 3 through a supply valve 14, the crank end of the cylinder meantime exhausting through valve 17. Due to the free or floating mounting of the cylinder and its piston rod from and between the lower ends of the rocker arms 4a, 4b, admission of compressed air causes the lower ends of the rocker arms to be power-actuated in separating direction, and the upper ends thereof to be actuated towards one another. This latter movement of the upper ends of the rocker arms is transmitted to the pusher links 7a, 7b and in turn to the thrust pieces 11a, 11b. Accordingly, the pointed or shovel edges of the latter are driven into the joint between the edge flanges of rim 13 and the tire bead 18, thereby to break the tire loose from its rim, in the manner shown in Fig. 3.

Should one side of the tire break loose from the rim flange sooner than the other, then the stop block on the side that has been broken will move against the edge of the tire rim, and thereby enable the thrust piece on the other side to proceed with its breaking action.

Compressed air is thereupon admitted to the cylinder 3 through valve 17 (valve 14 being meanwhile opened), thus forcing the piston and cylinder back to their initial position illustrated in Fig. 1. Accordingly, the lower ends of the rocker arms are retracted and effect retraction of the thrust links and the thrust pieces. The tire may now be lifted or rolled out of the machine and its removal from the rim effected manually.

A truck tire may be handled by the machine as described in substantially the same manner, with the exception that one of the thrust pieces is removed from its pusher link, as by withdrawing the pin by which it is pivotally connected thereto. Upon setting up of the truck tire, the block 16a (or 16b) on the pusher link from which the thrust piece has been removed is then allowed to engage the tire rim whereupon the remaining thrust piece can operate in the manner previously described.

In breaking a truck tire, approximately three breaking operations are required to completely break the tire from its rim, the tire being turned approximately 120° between each such operation. However, in breaking of tires of the sizes and types used on passenger cars, a single breaking operation suffices to break the tire head away from its rim sufficiently as to facilitate the subsequent removal of the tire from the rim by conventional hand operations now followed.

While the companion thrust pieces 11a, 11b are capable of themselves holding the tire upright in the machine, additional tire supporting means may be incorporated. For example, arched supports bridging the spaced uprights and disposed front and rear thereof may be supplied if additional tire support is deemed desirable or necessary.

Without further analysis, it will be appreciated that a tire breaking machine according to the present invention is of exceedingly simple construction and operation. In setting up a tire to be broken from its rim, the operator is required only to roll the tire into position such that the edge portion of the rim is held at both sides by the thrust pieces 11, 11a, the arcuate length of which is dimensioned so as to be sufficient to hold the tire in upright or substantially upright position. Upon the operator supplying air to the head end of the cylinder, the machine proceeds to effect breaking of the tire away from its rim in completely automatic manner and, upon breaking being completed, the operator merely admits air to the other end of the cylinder to effect retraction of the thrust pieces, whereupon the tire and its rim may be taken from the machine and the tire removed from the rim. It will also be observed that, due to its simple design and minimum number of parts, the tire breaking machine as described is capable of inexpensive manufacture.

As many changes could be made in carrying out the above construction without departing from the scope of the invention, it is intended that all matter contained in the above description or shown in the accompanying drawing shall be interpreted as illustrative and not in a limiting sense.

We claim:

1. A machine for breaking the beads of a tire from its rim comprising, in combination, a frame, oppositely disposed and substantially horizontally arranged pusher links supported in said frame for movement in substantially endwise direction towards and away from one another, oppositely disposed thrust pieces pivotally connected at their outer ends to the adjacent ends of the pusher links so as to swing in a vertical plane, cooperating means on the connected ends of the pusher links and thrust pieces for causing said thrust pieces to extend generally inwardly from said pusher links and to assume a normal position in which they are slightly upwardly inclined and providing also that the thrust pieces can swing in upward direction only upon their free ends engaging a tire bead, the thrust pieces converging to blade-like edges which are adapted to penetrate the joint between tire bead and rim flange, cooperating stop means on said pusher links and thrust pieces for precluding upward swinging movement of the thrust pieces past the vertical, and power means for actuating the pusher links towards and away from one another.

2. A machine for breaking the beads of a tire from its rim comprising, in combination, a frame, oppositely disposed and substantially horizontally arranged pusher links supported in said frame for movement in substantially endwise direction towards and away from one another, oppositely disposed thrust pieces pivotally connected at their outer ends to the adjacent ends of the pusher links so as to swing in a vertical plane, cooperating means on the connected ends of the pusher links and thrust pieces for causing said thrust pieces to extend generally inwardly from said pusher links and to assume a normal position in which they are slightly upwardly inclined and providing also that the thrust pieces can swing in upward direction only upon their free ends engaging a tire bead, the thrust pieces converging to blade-like edges which are adapted to penetrate the joint between tire bead and rim flange, cooperating stop means on said pusher links and thrust pieces for precluding upward swinging movement of the thrust pieces past the vertical, oppositely disposed rocker arms fulcrumed intermediate their ends to the frame and being pivotally connected at their upper ends to the opposite ends of the pusher links, and power means operative to spread and retract the lower ends of said rocker arms thereby to actuate the pusher links and the thrust pieces carried thereby towards and away from each other.

3. A machine for breaking the beads of a tire from its rim as set forth in claim 1, wherein the pusher links are slidably connected to the frame by pin and slot connections.

4. A machine for breaking the beads of a tire from its rim as set forth in claim 2, wherein said power means has a floating connection with and is operative between the lower ends of said rocker arms, and said power means comprises a power cylinder having a piston rod, of which the cylinder is pivotally connected at its head end to the lower end of one rocker arm and the free end of the piston rod is pivotally connected to the lower end of the opposite rocker arm.

5. A machine for breaking the beads of a tire from its rim as set forth in claim 1, wherein fixed stop blocks are carried at the adjacent ends of said pusher links, and wherein the pivotal connection between the pusher links and the thrust pieces permits physical removal of said thrust pieces from said pusher links, whereby, upon removal of a thrust piece from one pusher link, the stop block of said one pusher link provides an abutment for the tire rim while the remaining thrust piece is operating in normal manner.

MELVIN D. BUTTERFIELD.
LLOYD W. MULLINS.

REFERENCES CITED

The following references are of record in the file of this patent:

UNITED STATES PATENTS

| Number | Name | Date |
|---|---|---|
| 1,066,210 | Mahon | July 1, 1913 |
| 1,564,496 | Staugaard | Dec. 8, 1925 |
| 1,793,607 | Goodman | Feb. 24, 1931 |
| 1,863,867 | Renn | June 21, 1932 |
| 1,911,655 | Thomsen | May 30, 1933 |
| 1,966,766 | Raby at al. | July 17, 1934 |
| 2,199,162 | Oliva | Apr. 30, 1940 |
| 2,281,476 | Casey | Apr. 28, 1942 |
| 2,333,880 | Ohlsen | Nov. 9, 1943 |
| 2,439,135 | Johnson et al. | Apr. 6, 1948 |

FOREIGN PATENTS

| Number | Country | Date |
|---|---|---|
| 622,630 | France | Feb. 28, 1927 |